(12) United States Patent
Cho (10) Patent No.: US 7,629,072 B2
(45) Date of Patent: Dec. 8, 2009

(54) MEMBRANE-ELECTRODE ASSEMBLY FOR FUEL CELL AND FUEL CELL SYSTEM COMPRISING THE SAME

(75) Inventor: Kyu-Woong Cho, Suwon-si (KR)

(73) Assignee: Samsung SDI Co., Ltd., Suwon (KR)

( * ) Notice: Subject to any disclaimer, the term of this patent is extended or adjusted under 35 U.S.C. 154(b) by 812 days.

(21) Appl. No.: 11/114,103

(22) Filed: Apr. 26, 2005

(65) Prior Publication Data

US 2005/0238936 A1 Oct. 27, 2005

(30) Foreign Application Priority Data

Apr. 27, 2004 (KR) .............. 10-2004-0028909

(51) Int. Cl.
*H01M 4/90* (2006.01)
(52) U.S. Cl. .............. 429/40; 429/41; 429/30
(58) Field of Classification Search .......... 429/40, 429/41, 44, 30; 427/115; 204/282; 502/185, 502/101
See application file for complete search history.

(56) References Cited

U.S. PATENT DOCUMENTS

| | | | |
|---|---|---|---|
| 4,447,506 A | | 5/1984 | Luczak et al. |
| 4,460,710 A | * | 7/1984 | Sapienza et al. ............ 518/700 |
| 4,822,699 A | | 4/1989 | Wan |
| 2004/0131919 A1 | * | 7/2004 | Yasumoto et al. ............. 429/42 |
| 2006/0063061 A1 | * | 3/2006 | Zhu et al. ...................... 429/40 |

FOREIGN PATENT DOCUMENTS

| | | |
|---|---|---|
| CN | 1329372 | 1/2002 |
| CN | 1423355 | 6/2003 |
| JP | 61-107664 | 5/1986 |
| JP | 62155940 | 7/1987 |
| JP | 02061961 | 3/1990 |
| JP | 04079161 | 3/1992 |
| JP | 04087260 | 3/1992 |
| JP | 06029028 | 2/1994 |
| JP | 06176766 | 6/1994 |
| JP | 08141400 | 6/1996 |
| JP | 2001085020 | 3/2001 |
| JP | 2002246033 | 8/2002 |
| JP | 2002248350 | 9/2002 |
| JP | 2003024798 | 1/2003 |
| JP | 2003077481 | 3/2003 |
| KR | 10-1996-0000020 | 1/1996 |

* cited by examiner

*Primary Examiner*—Raymond Alejandro
(74) *Attorney, Agent, or Firm*—H.C. Park & Associates, PLC (57) ABSTRACT

A membrane-electrode assembly includes a catalyst layer formed on both sides of a polymer electrolyte membrane, a platinum (Pt)-metal alloy catalyst included in the catalyst layer, wherein the alloy catalyst shows a diffraction peak in a 110 plane at a degree of 2q =30–35 in the measurement of X-ray (CuK α) diffraction. The alloy catalyst has an excellent stability due to the compact crystal lattice structure of the catalyst, and it incurs low production costs and has sensitive reactivity.

6 Claims, 5 Drawing Sheets

MEMBRANE-ELECTRODE ASSEMBLY FOR FUEL CELL AND FUEL CELL SYSTEM COMPRISING THE SAME

CROSS REFERENCE TO RELATED APPLICATION

This application claims priority to and benefit of Korean Patent Application No. 10-2004-0028909 filed in the Korean Intellectual Property Office on Apr. 27, 2004, the entire content of which is incorporated herein by reference.

FIELD OF THE INVENTION

The present invention relates to a membrane-electrode assembly for a fuel cell and a fuel cell system comprising the same. In particular, the present invention relates to a membrane-electrode assembly for a fuel cell that includes a catalyst that has a long lifespan due to its solid structure. The present invention also relates to a fuel cell system comprising the membrane-electrode assembly.

BACKGROUND OF THE INVENTION

Generally, a fuel cell is an electric power generation system that converts chemical energy into electrical energy based on a chemical reaction between hydrogen from a hydrocarbon-based material such as, for example, methanol, ethanol, and natural gas, and oxygen.

Depending on the type of electrolyte used, fuel cells are divided into categories including a Phosphoric Acid Fuel Cell (PAFC) that operates at around 150 to 200° C., a Molten Carbonate Fuel Cell (MCFC) that operates at a high temperature of 600 to 700° C., a Solid Oxide Fuel Cell (SOFC) that operates at a high temperature of over 1000° C., and a Proton Exchange Membrane Fuel Cell (PEMFC) and a Alkaline Fuel Cell (AFC) that operate between room temperature and 100° C. These fuel cells all operate on the same principle, but the types of fuel, operating temperature, catalyst, and the electrolyte used are different from each other.

The PEMFC has excellent output characteristics, fast starting and response characteristics, as well as a low operating temperature, when compared to other types of fuel cells. It also has the advantage of having a wide range of applications including use as a distributed power source for houses and large buildings, as a small power source for electronic devices, and as a mobile power source for a car.

The basic structure of a PEMFC system includes a fuel cell body called a stack, a fuel tank, and a fuel pump that supplies fuel from the fuel tank to the stack. It further requires a reformer that generates hydrogen by converting fuel such as methanol, ethanol, or natural gas from the fuel tank and supplies the hydrogen to the stack. The PEMFC generates electricity by first pumping the fuel stored in the fuel tank to the reformer using the fuel pump. Then hydrogen gas is generated through the fuel reformation in the reformer and subsequently reacts with oxygen in the stack.

In addition, the fuel cell can have a Direct Methanol Fuel Cell (DMFC) configuration in which liquid-phase methanol fuel is directly supplied to the stack. Unlike PEMFCs, DMFCs do not require a reformer.

In the above fuel cell system, the stack includes numerous unit cells that are arranged in multiple layers. Each unit cell is formed of a membrane-electrode assembly (MEA) and a separator or bipolar plate. The membrane-electrode assembly includes an anode and a cathode that are each attached to either side of an electrolyte membrane. The separator provides a path for supplying hydrogen gas and oxygen and serves as a conductor that couples the anode and cathode of the membrane-electrode assembly. The separator allows hydrogen gas to be supplied to the anode and for oxygen to be supplied to the cathode. The hydrogen gas undergoes an electrochemical oxidation reaction at the anode and the oxygen undergoes an electrochemical reduction reaction at the cathode. The transfer of electrons during the reactions generates electricity as well as heat and water.

A platinum (Pt) catalyst is usually used for the oxygen reduction reaction at the cathode. However, since platinum is expensive, metal alloy catalysts have been researched.

U.S. Pat. No. 4,447,506 discloses metal alloy catalysts that include platinum-chromium-cobalt (Pt—Cr—Co), platinum-chromium (Pt—Cr), and the like. Also, U.S. Pat. No. 4,822,699 discloses metal alloy catalysts such as platinum-gallium (Pt—Ga) and platinum-chromium (Pt—Cr). However, none of the patent literature provides a clear explanation of how the binding force of the platinum-oxygen bond affects the oxidation and reduction reaction mechanisms and the overall activity of a catalyst.

SUMMARY OF THE INVENTION

This invention provides a membrane-electrode assembly for a fuel cell that includes an alloy catalyst that has excellent stability and a long lifespan due to its compact crystal lattice structure. In addition, it may be produced at a lower cost and can achieve improved reactivity.

The present invention also provides a method for preparing a catalyst that has excellent stability and lifespan characteristics due to a solid structure.

The present invention also provides a fuel cell system that includes the membrane-electrode assembly described above.

Additional features of the invention will be set forth in the description which follows, and in part will be apparent from the description, or may be learned by practice of the invention.

The present invention discloses a membrane-electrode assembly for a fuel cell that includes a catalyst layer comprising a platinum-metal alloy catalyst that is placed on both sides of a polymer electrolyte membrane. The alloy catalyst shows an X-ray (CuK α) diffraction peak of 2θ=30–35 in a 110 plane.

The present invention also discloses a method for preparing a catalyst for a fuel cell that includes the steps preparing a mixture by mixing a platinum-including material and a metal-including material for a fuel cell, drying the mixture, and performing heat treatment on the dried mixture.

The present invention also discloses a fuel cell system that includes at least one unit cell including a polymer electrolyte membrane, a membrane-electrode assembly including an anode and a cathode coated with a catalyst layer on both sides of the polymer electrolyte membrane, and a separator inserted on both sides of the membrane-electrode assembly. In addition, the fuel cell system includes a fuel supply source for supplying fuel including hydrogen to the unit cell and an oxygen supply source for supplying oxygen to the unit cell. The catalyst layer includes a platinum-metal alloy catalyst that shows a diffraction peak in a 110 plane at a degree of 2θ=30–35 in the measurement of X-ray (CuK α) diffraction.

It is to be understood that both the foregoing general description and the following detailed description are exemplary and explanatory and are intended to provide further explanation of the invention as claimed.

DETAILED DESCRIPTION OF THE INVENTION

The chemical reactions inside a fuel cell according to the present invention are denoted as follows.

| | |
|---|---|
| Cathode reaction: | $O_2 + 4H^+ + 4e^- \rightarrow 2H_2O$ |
| Anode reaction: | $H_2 \rightarrow 2H^+ + 2e^-$ |
| Overall reaction: | $2H_2 + O_2 \rightarrow 2H_2O$ |

The oxygen reduction at the cathode is a rate determining step and its detailed mechanism is not fully understood.

One theory is that hydrogen reacts with oxygen that is adsorbed on the surface of platinum and the product of the reaction is desorbed from the surface of the platinum to thereby form water. Thus, the adsorption intensity of oxygen on the surface of platinum affects the cathode reaction rate as well as the overall reaction rate of the chemical reactions in the fuel cell.

Figure 1:
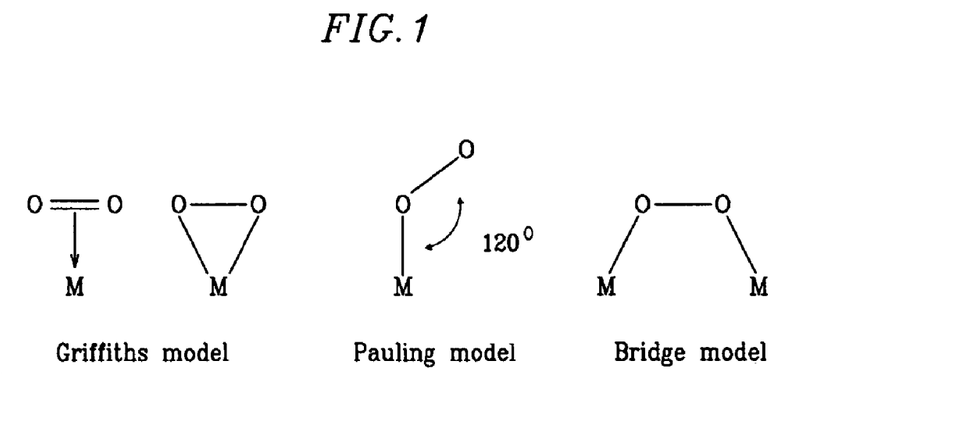
FIG. 1 is a diagram that shows platinum-oxygen adsorption models of a catalyst for a fuel cell in accordance with the present invention.

FIG. 1 presents platinum-oxygen adsorption models for a platinum-metal alloy for a fuel cell in accordance with the present invention.

As shown in FIG. 1, there are several Pt—O adsorption models, of which a bridge model is the strongest. In all of the models illustrated in FIG. 1, the binding force between platinum and oxygen (Pt—O) affects the chemical reaction mechanism of the fuel cell.

The catalyst for the fuel cell of the present invention includes a Pt-metal alloy with an X-ray (CuK α) diffraction peak in the 110 plane. The I(110)/I(111) value for this Pt-metal alloy which is a ratio of the intensity I(110) of an X-ray diffraction peak with respect to the 110 plane to the intensity I(111) of an X-ray diffraction peak with respect to the 111 plane, is more than 0.05. This ratio is preferably greater than 0.08, and more preferably has a value in the range of 0.08 to 0.3, and even more preferably it is a value in the range of 0.08 to 0.21.

According to the bridge model, the distance between platinum atoms affects the binding force with oxygen, and this is related to a lattice parameter of X-ray diffraction. Therefore, if the I(110)/I(111) value is more than 0.05, the number of crystal lattices of a catalyst that have a cubic structure is increased and the binding force with oxygen is increased as well. This makes the structure more compact and brings excellent stability to a catalyst. Therefore, the catalyst for a fuel cell of the present invention can improve the overall cell performance remarkably when it is used in the cathode of the fuel cell.

The ratio of the X-ray diffraction peak intensities is based on X-ray diffraction peak values measured using a Rigaku XRD CN 2115 instrument, a nickel (Ni) filter, a CuK α X-ray, a scanning rate of 5°/min (2-theta), an operating voltage of 40 kV, and a current of 30 mA.

Preferably, the catalyst for the fuel cell has a Pt-metal content molar ratio of between 40:60 to 60:40, and more preferably between 45:55 to 55:45. If the Pt-metal content molar ratio is less than 40:60, it becomes difficult to form the alloy. If it exceeds 60:40, the range of the I(110)/I(111) value is not satisfied.

The metal included in the catalyst is preferably one or more metals selected from a group consisting of Fe, Cr, Cr—Ni, and Co.

The average diameter of a particle of a catalyst alloy without a support is preferably between 30 to 150 Å, and more preferably between 30 to 100 Å. Generally, a small diameter of a catalyst particle is preferable in order to increase activity. However, if the diameter is less than 30 Å, it becomes difficult to form the catalyst. If the diameter exceeds 150 Å, the reaction surface area is too small to achieve a sufficient level of activity, and a higher temperature is required to perform heat treatment.

The platinum-metal alloy catalyst for a fuel cell of the present invention can be prepared using a material that comprises platinum and a material that comprises the metal. The method of preparation includes mixing the material comprising platinum and the material comprising the metal, drying the mixture, and heat treating the dried mixture.

The platinum-comprising material and the metal-comprising material are preferably combined in a molar ratio of the platinum to the metal in a range of 40:60 to 60:40, and more preferably, in the range of 45:55 to 55:45. If the platinum-to-metal molar ratio is less than 40:60, it is difficult to form the alloy. If it exceeds 60:40, the range of the I(110)/I(111) value is not satisfied.

As for the platinum-comprising material, a supported platinum that has conventionally been used for a fuel cell can be used. For example, the support material may include carbon, alumina, and silica. Carbon supports such as acetylene black or graphite are preferably used with the platinum catalyst.

The supported platinum of the present invention may be a commercial product or it can be prepared by supporting platinum on a support material. Since the process of supporting platinum on a support material is widely known to those skilled in the art, further description thereof will be omitted herein.

The metal-comprising material also includes any compound that can form a platinum-metal alloy. Preferably, more than one compound that includes iron (Fe), chromium (Cr), nickel (Ni), or cobalt (Co) can be used, and more preferably, one or more compounds selected from a group consisting of a metal halide including the above-mentioned metals, nitrate, hydrochloride, sulfate, and amines can be used. The metal-comprising material is preferably one or more compounds selected from a group consisting of a metal halide including Fe, Ni, Cr, or Co and nitrate.

The metal-comprising material may be dissolved in alcohol, water, or a mixture of alcohol and water to form a liquid solution. The molarity of the metal-including material in the solution ranges from 0.1 to 1 M.

The platinum-including material and the metal-including material are mixed and then dried in a conventional drying process to evaporate a solvent, such as water and alcohol.

After the mixture is dried, it undergoes a heat treatment. The heat treatment is preferably carried out at a temperature over 500° C. in a reduction atmosphere, and more preferably, in a temperature range of 700° C. through 1500° C., and most preferably, in a temperature range of 700° C. through 1100° C. If the temperature of the heat treatment is lower than 500° C., it is difficult to form the alloy. Also, if it exceeds 1500° C., the transition metal may evaporate and thus the alloy cannot be formed in an exact proportion.

The reduction atmosphere of the heat treatment can include hydrogen gas, nitrogen gas, or a mixture gas of hydrogen and nitrogen.

After the heat treatment, the alloy goes through a cooling process to form an alloy catalyst.

Figure 2:
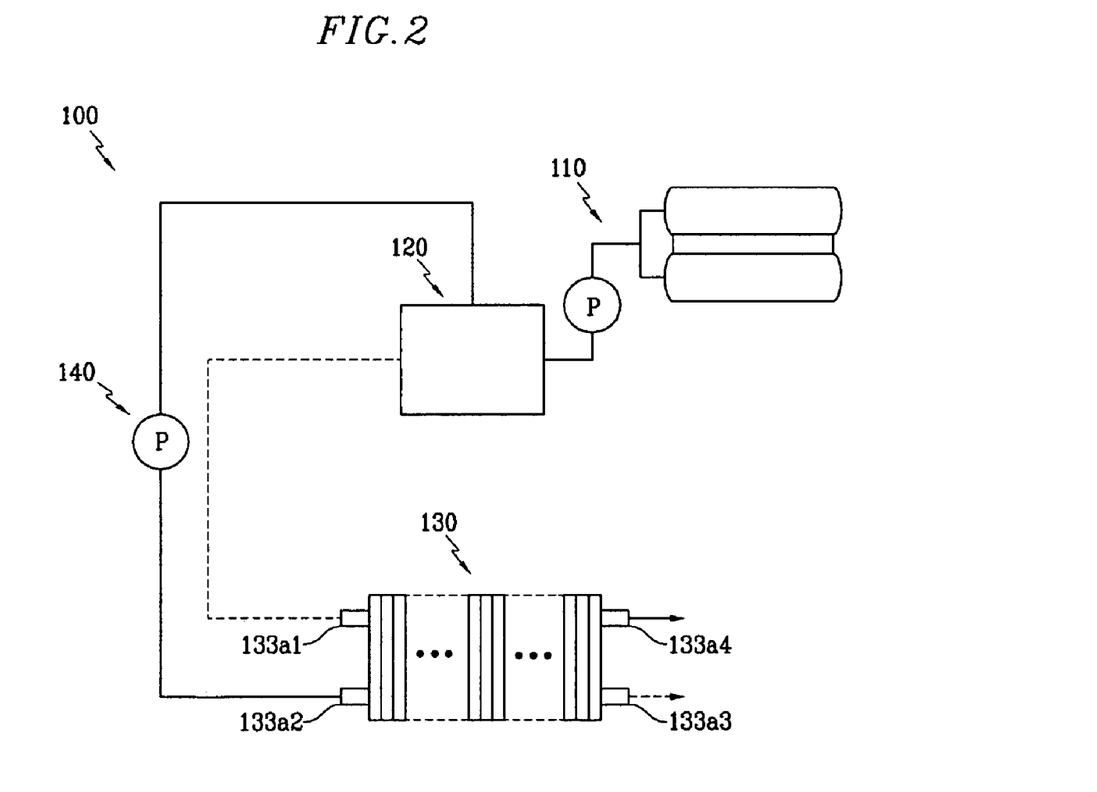
FIG. 2 is a schematic diagram that illustrates a fuel cell system in accordance with the present invention.
Figure 3:
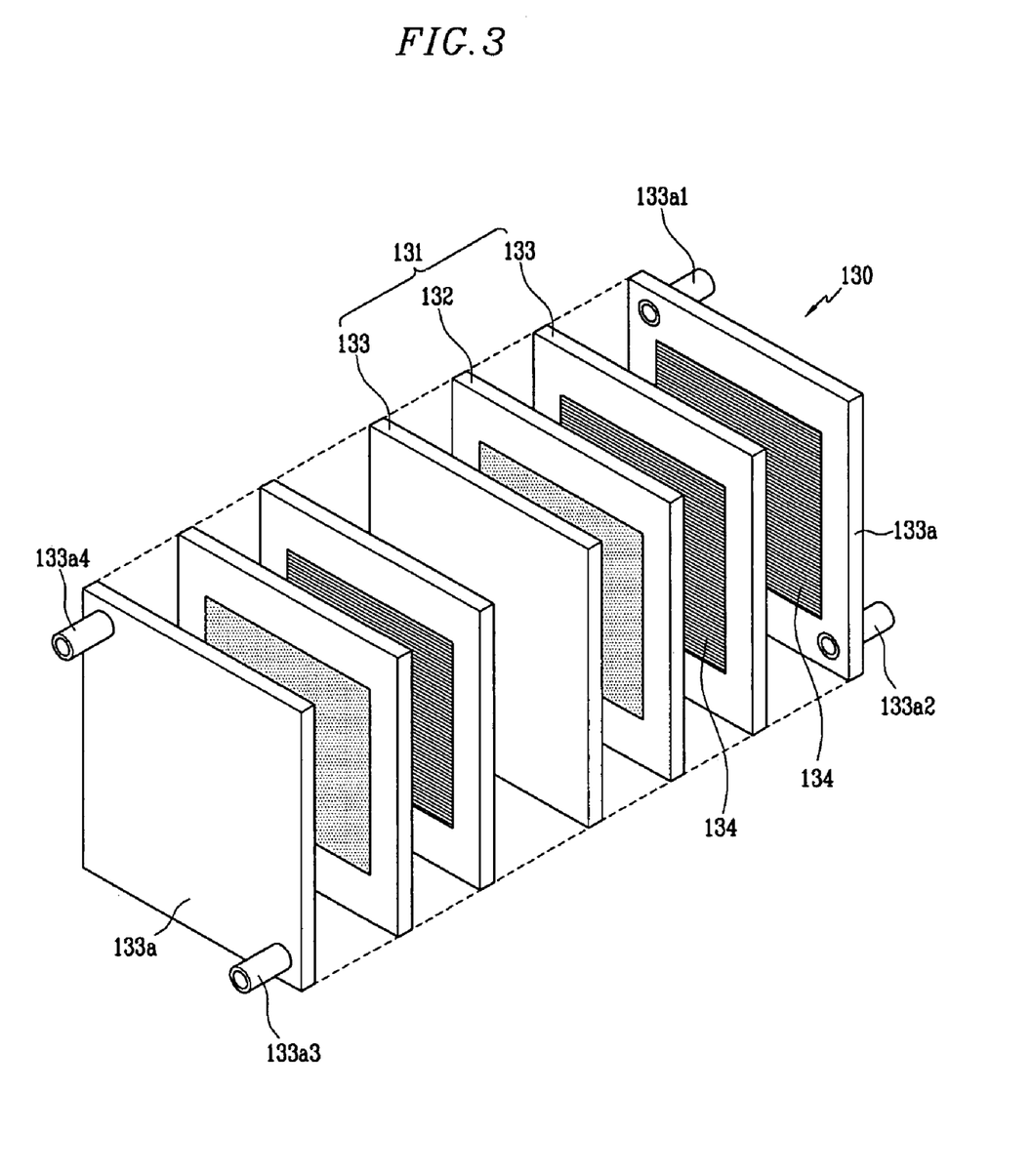
FIG. 3 is an exploded perspective view that describes a stack of a fuel cell system in accordance with the present invention.

Referring to FIG. 2 and FIG. 3, a fuel cell system 100 of the present invention includes a fuel supplying part 110 that supplies a mixture of fuel and water and a reformer 120 that converts the mixed fuel to generate hydrogen. In addition, it includes a stack 130 that includes a catalyst for a fuel cell to generate electricity by performing a chemical reaction between the hydrogen gas supplied from the reformer and external air and an air supplying part 140 that supplies external air to the reformer 120 and the stack 130.

Furthermore, the fuel cell system 100 of the present invention includes a plurality of unit cells 131 located in the stack 130 that induce an oxidation-reduction reaction between the hydrogen gas supplied from the reformer 120 and the external air supplied from the air supplying part 140 to generate electric energy.

Each unit cell generates electricity and includes a membrane-electrode assembly 132 which oxidizes hydrogen and reduces oxygen in air, and separators 133 which supply the hydrogen and air to the membrane-electrode assembly 132. The separators 133 are arranged on both sides of the membrane-electrode assembly 132. The separators that are respectively located at the most exterior sides of the stack are called end plates 133a.

The membrane-electrode assembly 132 includes an anode and a cathode that are formed on both sides of the membrane-electrode assembly.

The anode, which is supplied with hydrogen gas from the separator 133, includes a catalytic layer that oxidizes the hydrogen gas into electrons and hydrogen ions and a gas diffusion layer that moves the electrons and hydrogen ions smoothly.

In addition, the cathode which is supplied with air from the separator 133, includes a catalytic layer that induces a reduction reaction of oxygen in air, and a gas diffusion layer that moves the electrons and oxygen smoothly. The electrolyte membrane is a solid polymer electrolyte that serves as an ion exchanging membrane that moves the hydrogen ions generated at the catalytic layer of the anode to the catalytic layer of the cathode.

Moreover, the end plate 133a of the separators includes a first supply tube 133a1 for injecting the hydrogen gas supplied from the reforming part, and a second supply tube 133a2 for injecting the oxygen gas. The other end plate 133a includes a first discharge tube 133a3 for discharging the remaining hydrogen gas that does not react in the plurality of unit cells 131 to the outside, and a second discharge tube 133a4 for discharging the remaining air that does not react in the plurality of unit cells 131 to outside. The fuel cell system of the present invention is not limited to FIG. 2 and FIG. 3.

Hereinafter, preferred embodiments of the present invention will be described. However, it is understood that the examples are for illustration only, and that the present invention is not limited to these examples.

COMPARATIVE EXAMPLE 1

A commercial platinum/carbon (Pt/C) catalyst with a platinum content of 10 wt % (Johnson Matthey) was mixed with an aqueous 1M $FeCl_2$ solution and dispersed. The molar ratio of the Pt:Fe in the mixture was 1:1.

The mixture was then dried at 100° C. for one hour to thereby form a catalyst for a fuel cell.

EXAMPLE 1

A catalyst for a fuel cell was prepared by heat treating the catalyst for a fuel cell prepared according to Comparative Example 1 in a gas mixture of 10 vol % hydrogen and 90 vol % nitrogen at 700° C. for 2.5 hours.

EXAMPLE 2

A catalyst for a fuel cell was prepared in the same manner as in Example 1 except that the temperature of the heat treatment was 900° C.

EXAMPLE 3

A catalyst for a fuel cell was prepared in the same manner as in Example 1 except that the temperature of the heat treatment was 1100° C.

COMPARATIVE EXAMPLE 2

A commercial Pt/C catalyst with a platinum content of 10 wt % (Johnson Matthey) was mixed with an aqueous 1M mixed solution of $Cr(NO_3)_3 \cdot 9H_2O$ and $NiCl_2$ and dispersed. The molar ratio of Pt:Cr:Ni in the mixture was 2:1:1.

The mixture was then dried at 100° C. for one hour to thereby form a catalyst for a fuel cell.

EXAMPLE 4

A catalyst for a fuel cell was prepared by heat treating the catalyst prepared according to the Comparative Example 2 in a gas mixture of 10 vol % hydrogen and 90 vol % nitrogen at 700° C. for 2.5 hours.

EXAMPLE 5

A catalyst for a fuel cell was prepared in the same manner as in Example 4 except that the temperature of the heat treatment was 900° C.

EXAMPLE 6

A catalyst for a fuel cell was prepared in the same manner as in Example 4 except that the temperature of the heat treatment was 1100° C.

COMPARATIVE EXAMPLE 3

A catalyst for a fuel cell was prepared by heat treating the commercial Pt/C catalyst with a platinum content of 10 wt %

(Johnson Matthey) in a gas mixture of 10 vol % hydrogen and 90 vol % nitrogen at 800° C. for 2.5 hours.

COMPARATIVE EXAMPLE 4

A commercial Pt/C catalyst with a platinum content of 10 wt % (Johnson Matthey) was mixed with an aqueous 1M $NiCl_2$ solution and dispersed. The molar ratio of Pt:Ni in the mixture was 1:1.

The mixture was then dried at 100° C. for one hour to thereby form a catalyst for a fuel cell.

COMPARATIVE EXAMPLE 5

A catalyst for a fuel cell was prepared by heat treating the catalyst for a fuel cell prepared according to the Comparative Example 4 in a gas mixture of 10 vol % hydrogen and 90 vol % nitrogen at 700° C. for 2.5 hours.

COMPARATIVE EXAMPLE 6

A catalyst for a fuel cell was prepared in the same manner as the Comparative Example 5 except that the temperature of the heat treatment was 900° C.

COMPARATIVE EXAMPLE 7

A catalyst for a fuel cell was prepared in the same manner as in Comparative Example 5 except that the temperature of the heat treatment was 1100° C.

Figure 4:
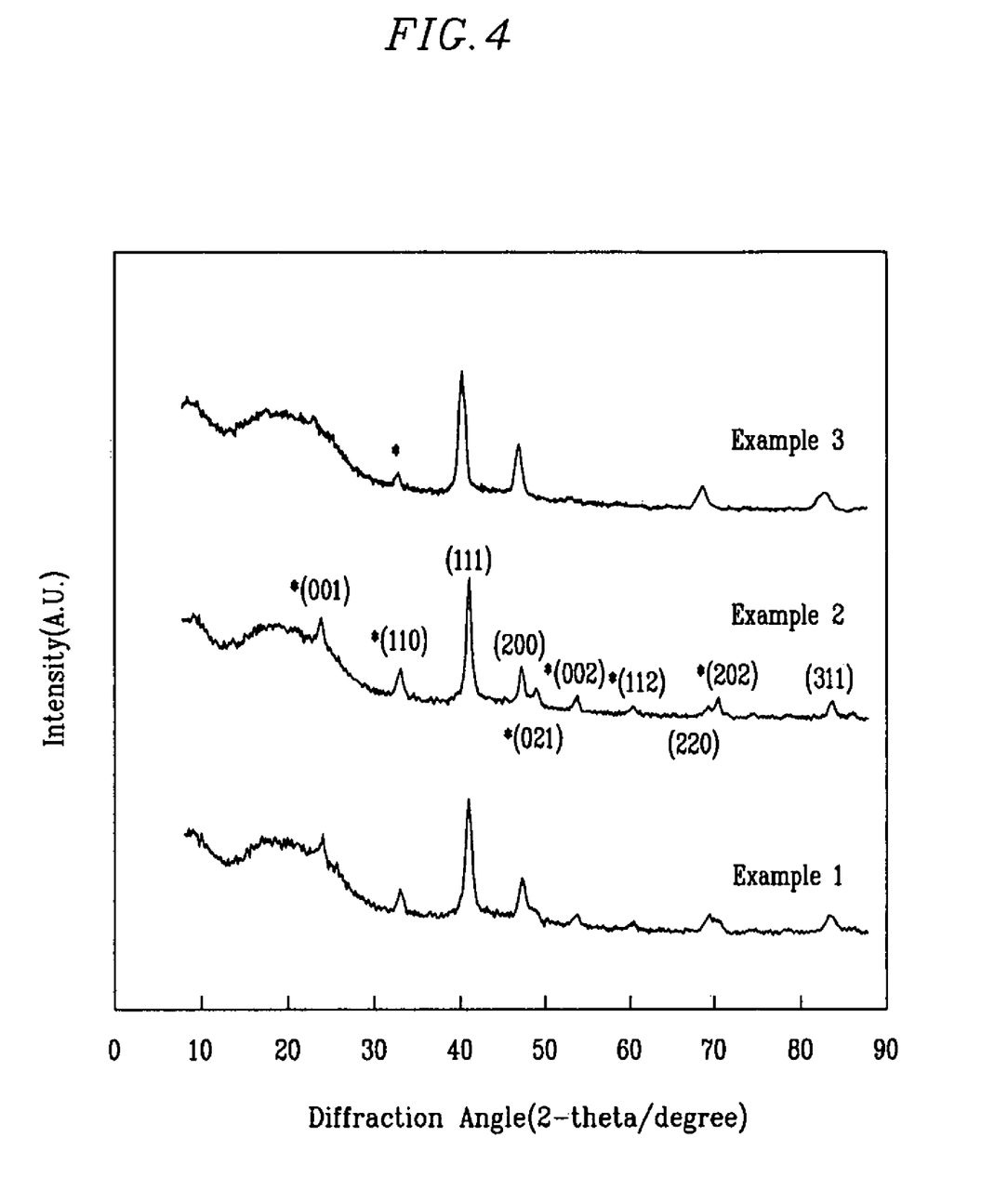
FIG. 4 is a graph that shows the X-ray diffraction patterns of the catalysts for the fuel cell prepared in accordance with Example 1, Example 2, and Example 3 of the present invention.

X-ray diffraction patterns of the catalysts for a fuel cell prepared according to Examples 1 through 6 and the Comparative Examples 2 through 7 were measured. FIG. 4, presents X-ray diffraction patterns of the catalysts prepared according to Examples 1 to 3, FIG. 5 presents X-ray diffraction patterns of the catalysts prepared according to the Comparative Example 2 and Examples 4 to 6, and FIG. 6 presents X-ray diffraction patterns of the catalysts prepared according to the Comparative Examples 3 to 7.

The X-ray diffraction intensities were measured using an XRD CN 2115 instrument (Rigaku), Ni filter, CuKα x-ray, a scanning rate of 5°/min (2-theta), an operating voltage of 40 KV and an operating current of 30 mA.

Figure 5:
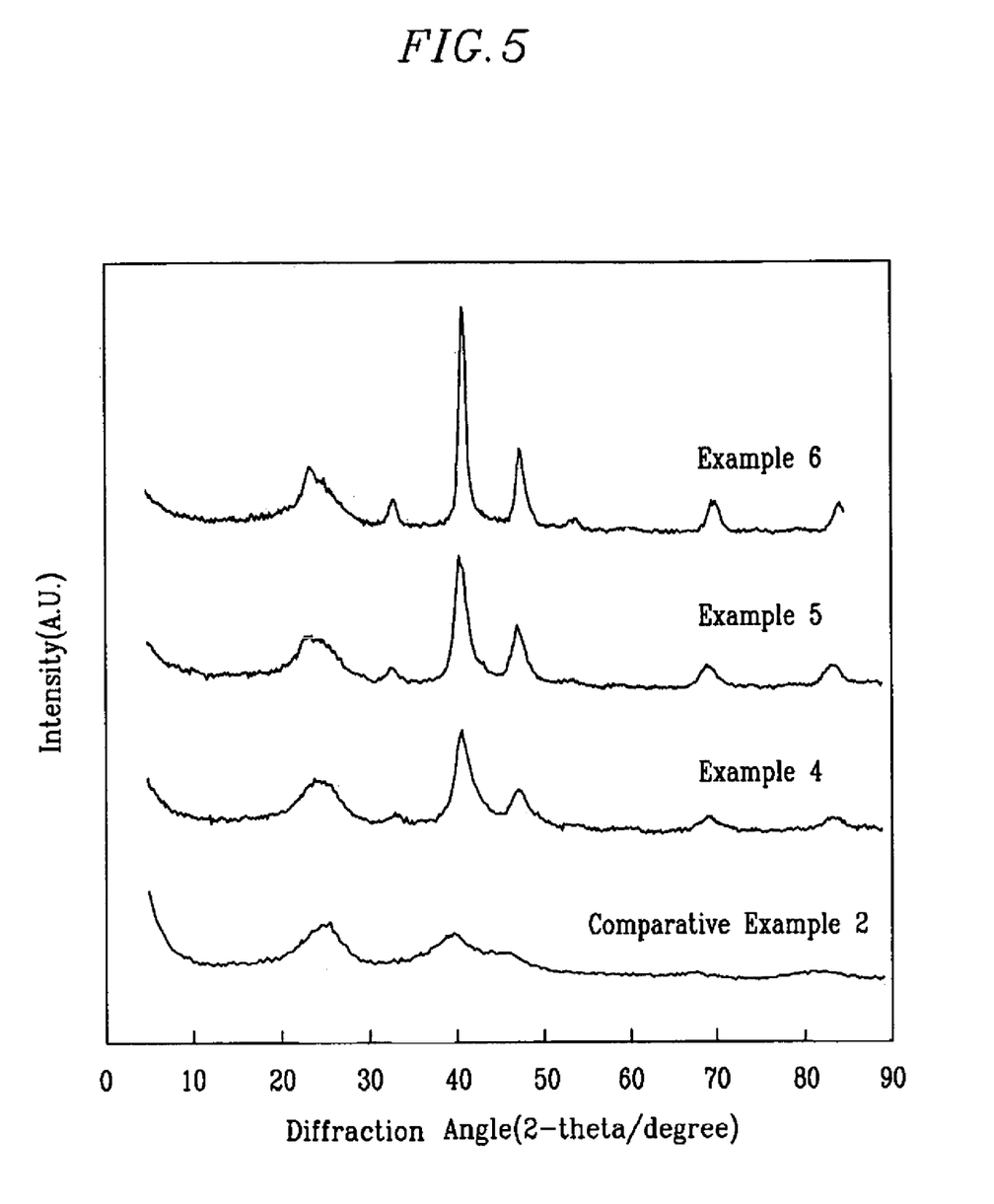
FIG. 5 is a graph depicting X-ray diffraction patterns of the catalysts for a fuel cell prepared in accordance with Comparative Example 2, Example 4, Example 5, and Example 6 of the present invention.
Figure 6:
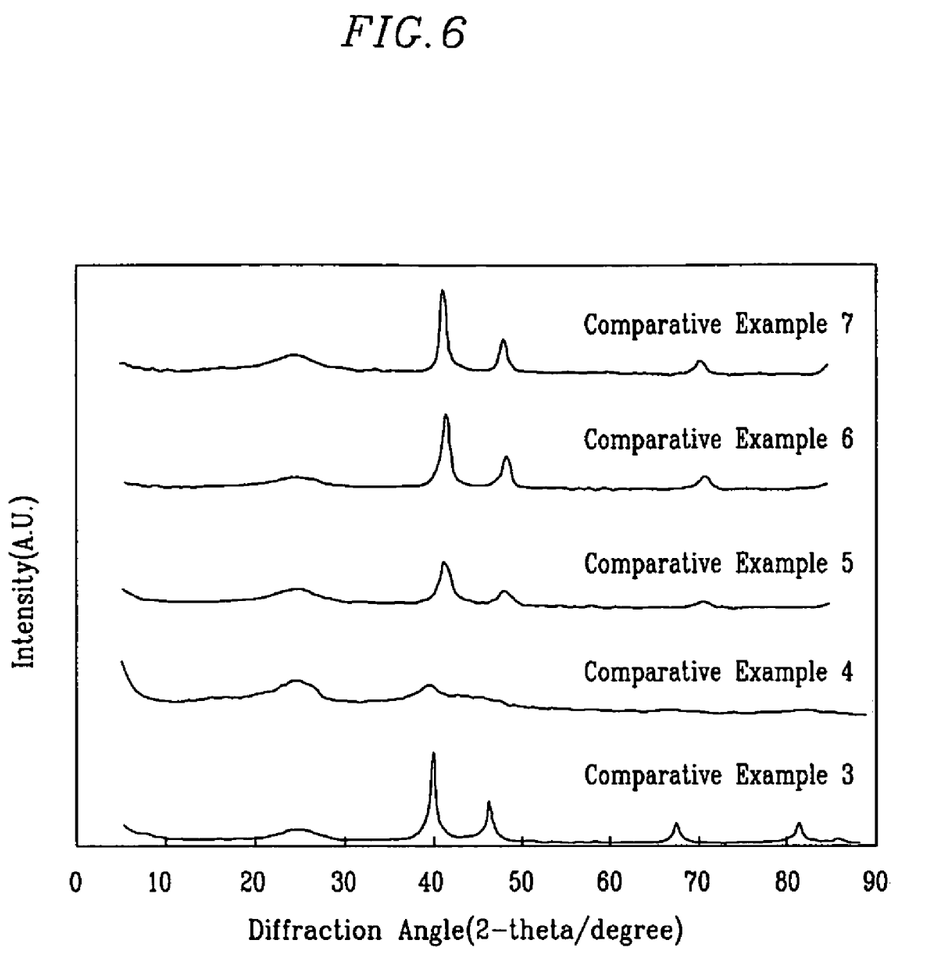
FIG. 6 is a graph that shows an X-ray diffraction pattern of a catalyst for the fuel cell fabricated in accordance with Comparative Examples 3, 4, 5, 6 and 7.

As shown in FIG. 4 and FIG. 5, the catalysts for a fuel cell prepared based on Examples 1 to 6 show peaks by the 110 plane around a diffraction angle (2-theta) of 32°. On the other hand, the catalysts prepared according to the Comparative Examples 2 to 7 do not present a peak by the 110 plane, which is shown in FIG. 5 and FIG. 6.

Also, intensity ratios of I(110)/I(111) are calculated based on the X-ray diffraction peaks illustrated in FIG. 4, FIG. 5, and FIG. 6 and the values are presented in the following Table 1. The elements and composition ratio of the catalysts, temperatures of heat treatment, and average diameter of particles are presented in Table 1.

TABLE 1

| | Elements of Alloy | Pt:Metal | Temp. of Heat Treat. (° C.) | Particle Diameter (Å) | INTENSITY RATIO I(110)/I(111) |
|---|---|---|---|---|---|
| Comparative Example 1 | Pt—Fe | 1:1 | No Heat Treat. | <20 | 0 |
| Example 1 | Pt—Fe | 1:1 | 700 | 86.2 | 0.15 |
| Example 2 | Pt—Fe | 1:1 | 900 | 108 | 0.21 |
| Example 3 | Pt—Fe | 1:1 | 1100 | 88.2 | 0.09 |
| Comparative Example 2 | $Pt_2$—Cr—Ni | 2:1:1 | No Heat Treat. | <20 | 0 |
| Example 4 | $Pt_2$—Cr—Ni | 2:1:1 | 700 | 44.7 | 0.08 |
| Example 5 | $Pt_2$—Cr—Ni | 2:1:1 | 900 | 54 | 0.08 |
| Example 6 | $Pt_2$—Cr—Ni | 2:1:1 | 1100 | 93.7 | 0.14 |
| Comparative Example 3 | Pt | — | 800 | 94 | 0 |
| Comparative Example 4 | Pt—Ni | 1:1 | No Heat Treat. | <20 | 0 |
| Comparative Example 5 | Pt—Ni | 1:1 | 700 | 56.9 | 0 |
| Comparative Example 6 | Pt—Ni | 1:1 | 900 | 74.7 | 0 |
| Comparative Example 7 | Pt—Ni | 1:1 | 1100 | 89.3 | 0 |

Table 1 shows that the Pt and Pt—Ni catalysts do not show X-ray diffraction peaks in the 110 plane, whether the catalysts have gone through heat treatment or not. However, the Pt-metal alloy catalyst prepared according to Examples 1 to 6 of the present invention have a peak in the 110 plane and also have a I/(110)/I(111) value over 0.05. Consequently, it can be determined that the alloy catalyst of the examples have stronger structures than the catalysts of the Comparative Examples 1 to 7.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A membrane-electrode assembly for a fuel cell, comprising:
   a polymer electrolyte membrane;
   a catalyst layer formed on each sides of the polymer electrolyte membrane; and
   a platinum-metal alloy catalyst included in the catalyst layers, wherein the alloy catalyst shows an X-ray (CuK α) diffraction peak in a 110 plane at a degree of 2θ=30–35, and wherein a value of a diffraction peak ratio of the diffraction peak intensity of the 110 plane to a diffraction peak intensity of a 111 plane is greater than 0.05 in an X-ray (CuK α) diffraction pattern.

2. The membrane-electrode assembly of claim 1, wherein the value of the diffraction peak ratio is in a range of 0.08 to 0.21.

3. The membrane-electrode assembly of claim 1, wherein a molar ratio of platinum to metal is in a range of 40:60 to 60:40.

4. The membrane-electrode assembly of claim 1, wherein the metal is one or more selected from a group consisting of iron, chromium, chromium-nickel, and cobalt.

5. The membrane-electrode assembly of claim 1, wherein an average particle size of the alloy catalyst is in a range of 30 Å to 150 Å.

6. The membrane-electrode assembly of claim 1, wherein one of the catalyst layers is in a cathode.

\* \* \* \* \*

UNITED STATES PATENT AND TRADEMARK OFFICE
CERTIFICATE OF CORRECTION

PATENT NO.       : 7,629,072 B2                                          Page 1 of 1
APPLICATION NO. : 11/114103
DATED            : December 8, 2009
INVENTOR(S)      : Kyu-Woong Cho It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1101 days.

Signed and Sealed this

Second Day of November, 2010

David J. Kappos
*Director of the United States Patent and Trademark Office*